No. 829,151. PATENTED AUG. 21, 1906.
J. L. HALL & W. C. YATES.
MOTOR STARTING RHEOSTAT.
APPLICATION FILED AUG. 23, 1904.
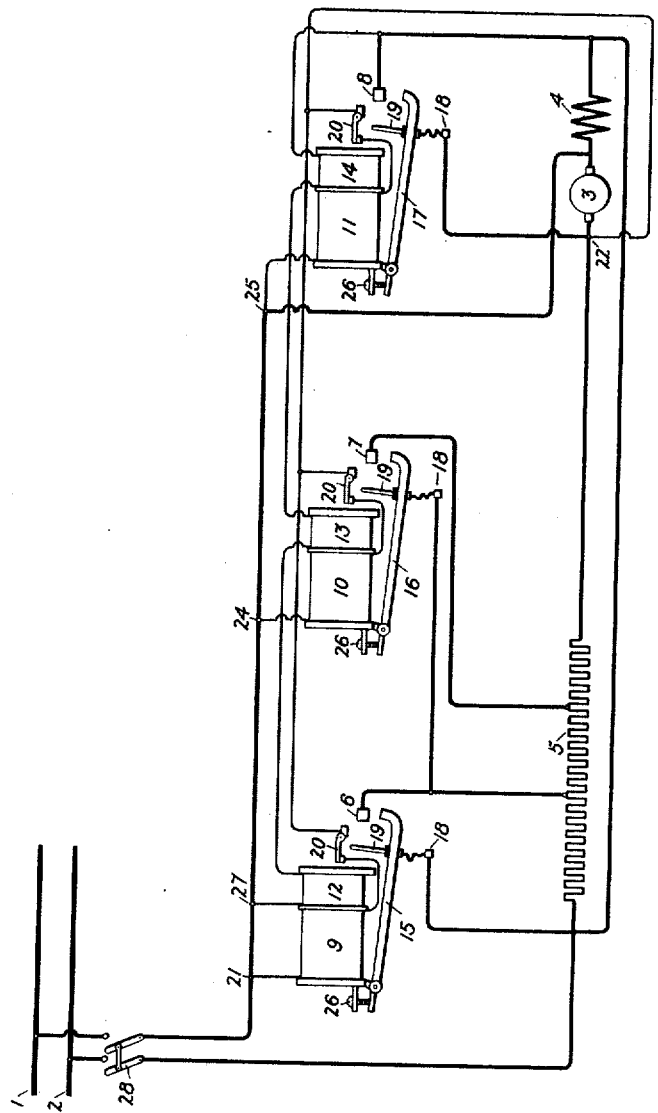
Witnesses.
Harry A. Tilden
Helen Oxford
Inventors.
John L. Hall.
William C. Yates.
by Albert G. Davis
Atty

UNITED STATES PATENT OFFICE.

JOHN L. HALL AND WILLIAM C. YATES, OF SCHENECTADY, NEW YORK, ASSIGNOR TO GENERAL ELECTRIC COMPANY, A CORPORATION OF NEW YORK.

MOTOR-STARTING RHEOSTAT.

No. 829,151.    Specification of Letters Patent.    Patented Aug. 21, 1906.

Application filed August 23, 1904. Serial No. 221,817.

*To all whom it may concern:*

Be it known that we, JOHN L. HALL and WILLIAM C. YATES, citizens of the United States, residing at Schenectady, county of Schenectady, State of New York, have invented certain new and useful Improvements in Motor-Starting Rheostats, of which the following is a specification.

This invention relates to motor-starting rheostats, and particularly to rheostats of this type arranged for automatic operation on closure of the circuit through the motor.

Our invention consists of the combination of an electric motor, a resistance in circuit therewith, and a plurality of electromagnetically-actuated switches arranged to be operated automatically in succession to short-circuit sections of the resistance. In order to avoid the danger of injury to the coils of the motor by the admission of an excessive current thereto while it is coming up to speed, we arrange the operation of these electromagnetically-actuated switches to be dependent on the counter electromotive force of the motor. The power required to operate these switches is greatly in excess of that necessary to hold them in the closed position, and for this reason we provide each switch with an actuating-coil and a retaining-coil, and arrange devices to open the circuit of the actuating-windings when the switches have been thrown to the closed position. The retaining-coils of the several switches remain permanently in circuit while the motor is running and are preferably connected in series across the lines.

The novel features of our invention will be definitely indicated in the claims appended hereto. The details of construction and the mode of operation of our improved motor-starting rheostat will be better understood by reference to the following description, taken in connection with the accompanying drawing, which shows in diagram the preferred embodiment of our invention.

In the drawing, 1 and 2 indicate positive and negative mains leading from any suitable source of supply of electric energy. 3 indicates the armature, and 4 the field, of an electric motor which is to be run by current from the mains 1 and 2. A resistance 5 is connected in series with the armature 3 of the motor and is divided into a plurality of sections by leads running to contacts 6, 7, and 8 of a corresponding number of electromagnetically-actuated switches, each of which when closed short-circuits one section of the resistance. In the present instance we have shown three short-circuiting switches and the resistance 5, divided into three sections, though any other number may be provided, if desired. Each of these switches has an actuating-winding 9, 10, and 11, a retaining-winding 12, 13, and 14, and a pivoted armature 15, 16, and 17, respectively, and each of these armatures is provided with a contact which when the switch is closed engages one of the stationary contacts 6, 7, and 8. Each of the armatures 15, 16, and 17 is connected by a flexible conductor to a binding-post 18, and each of these binding-posts is connected to the ends of the sections of the resistance 5, as shown. Each armature also carries a pin or projection 19, which when the switch is operated engages the movable arm of a small switch 20 and throws this latter switch to the open position. The actuating-winding 9 of the first switch is connected in circuit between the point 21 on the positive wire and the stationary contact of the small switch 20, and the movable contact of this switch is connected to the negative side of the armature at the point 22. The actuating-windings 10 and 11 of the other two switches are similarly connected between the points 24 and 25 on the positive wire and the point 22. It will thus be seen that the actuating-windings of the several switches are in shunt to the armature 3 of the motor, and the operation of the switches will therefore be dependent upon the counter electromotive force of the motor. In order that the switches may operate successively, any of the well-known expedients may be employed; but in order to permit the use of similar coils on all of the switches we prefer to obtain the successive operation by varying the air-gap between the contacts carried by the armatures 15, 16, and 17 and the stationary contacts 6, 7, and 8. This may readily be accomplished by the adjustable stops 26, mounted by threaded connections in projections on the magnets and coöperating with extensions on the armatures to limit the movement thereof. The retaining-windings 12, 13, and 14 of the electromagnetically-actuated switches are connected in series across the lines, one end of the winding 12 being connected to the positive wire at 27 and the opposite end of winding 14 being connected to the lead running from the contact 8 to the negative side of the armature 3 and the resistance 5.

The operation of the motor-starting rheostat will be understood from the foregoing description. Current is admitted to the motor by the closure of the line-switch 28, which may be mounted at any convenient point distant from the motor and which closes circuit through the armature 3 and resistance 5 in series, through the shunt-field 4, and through the retaining-coils 12, 13, and 14 in series. When circuit is first closed, the resistance 5 prevents dangerous overloading of the motor-armature 3, and the drop in voltage across the armature is so small that the current which is shunted through the actuating-coils 9, 10, and 11 of the switches is insufficient to operate the switches; but as the motor comes up to speed the counter electromotive force, and hence the drop across the armature, increases, causing more and more current to flow through these actuating-coils. After a predetermined rise in the counter electromotive force the operating-coil 9 of the first switch energizes the magnet with sufficient strength to attract armature 15, which when in the closed position engages the stationary contact 6, and thus closes a short-circuit around one section of the resistance 5. The movement of armature 15 also causes the pin 19 to open the switch 20, thus opening the circuit of the coil 9. The armature 15 is, however, held in the closed position by the retaining-winding 12, which, as heretofore explained, is connected in series with the retaining-windings of the other switches across the lines. The short-circuiting of one section of resistance 5 permits more current to flow through the motor-armature, and the motor therefore speeds up, causing an additional rise in the counter electromotive force. When the drop across the motor-armature, due to this rise in the counter electromotive force, has reached a definite amount, the armature 16 of the second switch, the air-gap of which is somewhat greater than that of the first switch, will be attracted, thus cutting out another section of the resistance 5, and, as in the case of the first switch, the actuating-winding will be open-circuited and the armature held in the closed position by the retaining-winding 13. The third switch has the greatest air-gap and is operated in a similar manner after the motor has speeded up still further. When the motor has come up to normal speed, the resistance 5 is all cut out, the actuating-windings of the several switches are all open-circuited, and the only loss of energy is in the retaining-windings 12, 13, and 14, and this loss is very small, since only a small amount of power is required to hold the switches in the closed position. When the line-switch 28 is opened, the circuits through the motor are opened and also the circuit through the retaining-windings 12, 13, and 14, and the armatures 15, 16, and 17 drop by gravity or are returned in any suitable manner to the positions illustrated in the drawing, so that all parts are in readiness for a repetition of the operation.

What we claim as new, and desire to secure by Letters Patent of the United States, is—

1. In combination, an electric motor, a plurality of switches for varying the speed of the motor, an actuating-coil on each switch for operating the same, means associated with each switch for deënergizing its actuating-coil upon the operation of the switch, and means for holding each switch in the operated position.

2. In combination, an electric motor, a plurality of switches for varying the speed of the motor, an actuating-coil upon each switch for operating the same, auxiliary contacts associated with each switch for deënergizing its actuating-coil upon the operation of the switch, and means for holding each switch in the operated position and maintaining the deënergized condition of the actuating-coil.

3. In combination, an electric motor, a plurality of normally open switches for varying the speed of the motor, an actuating-coil on each switch for operating the same, normally closed contacts associated with each of the switches and arranged in the circuits of their respective actuating-coils, means for opening each of said auxiliary contacts upon the closing of the respective switches, and means for holding each switch in the closed position and the contact in open position.

4. In combination, a motor, a plurality of switches for varying the speed of the motor, an actuating-coil for each switch, separate circuits for energizing said coils, means for opening each of said circuits upon the operation of the corresponding switch, and electromagnetic means for maintaining said circuits open and the switches in operated position.

5. In combination, an electric motor, a plurality of switches for varying the speed of the motor, an actuating-coil on each switch for operating the same, said switches being so connected and arranged that the switches operate in automatic succession as the counter electromotive force of the motor increases, means for deënergizing each of said coils during the period the corresponding switch remains in its operated position, and electromagnetic maintaining means for said switches.

6. In combination, an electric motor, a plurality of switches arranged to operate in automatic succession to vary the speed of the motor, an actuating-coil on each switch for operating the same, separate circuits for energizing each of said coils, means for opening each of said circuits upon the operation of the corresponding switch, and electromagnetic means for maintaining said circuits and the switches in operated position.

7. In combination, an electric motor, a resistance, switches for cutting said resistance into and out of the motor-circuit, an actuating-coil on each switch for operating the same, the several switches being arranged to operate in automatic succession to cut out the resistance, means associated with each switch for deënergizing its actuating-coil upon the operation of the switch, and means for maintaining each switch in its operated position and each coil in its deënergized condition.

8. In combination, a motor, a resistance, a plurality of switches for cutting said resistance into and out of the motor-circuit, an actuating-coil on each switch for operating the same, a coil on each switch for maintaining the switch in the operated position, and means associated with each switch for deënergizing its actuating-coil during the period the switch remains in its operated position.

9. In combination, a motor, a resistance, electromagnetically - operated switches for cutting said resistance into and out of the motor-circuit, an actuating-coil on each switch for operating the same, means for deenergizing each actuating-coil during the period the corresponding switch remains in its operated position, and a coil on each switch for maintaining it in its operated position, said maintaining-coils being connected in series across the line.

10. In combination, a motor, a resistance, electromagnetically - operated switches for cutting the resistance into and out of the motor-circuit, said switches having armatures arranged with varying air-gaps, actuating-coils on the switches connected in shunt to the motor-armature, maintaining-coils on the switches, and means for opening the circuit of each of said actuating-coils during the period the corresponding switch remains in the operated position.

11. In combination, a motor, a resistance in circuit therewith, electromagnetically-actuated switches for cutting the resistance into and out of the motor-circuit, actuating-coils on each of said switches arranged to operate said switches at different potentials, separate energizing circuits for each of said actuating-coils connected in shunt to the motor-armature, maintaining-coils for said switches arranged in series across the line, and means for opening the circuit of each actuating-coil upon the operation of the corresponding switch and holding it open while the switch is in its operated position.

In witness whereof ve have hereunto set our hands this 22d day of August, 1904

JOHN L. HALL.
WILLIAM C. YATES.

Witnesses:
BENJAMIN B. HULL,
HELEN ORFORD.